J. NOSSIAN.
Manufacture of Rock Candy.
No. 153,721.
Patented Aug. 4, 1874.
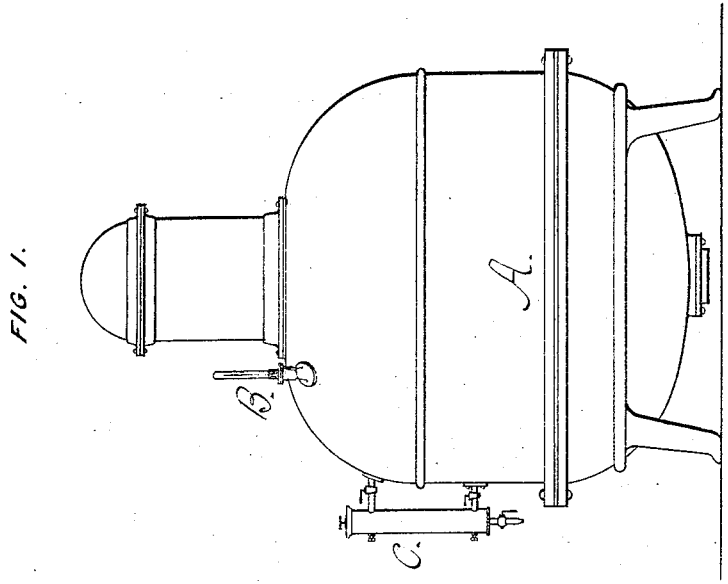
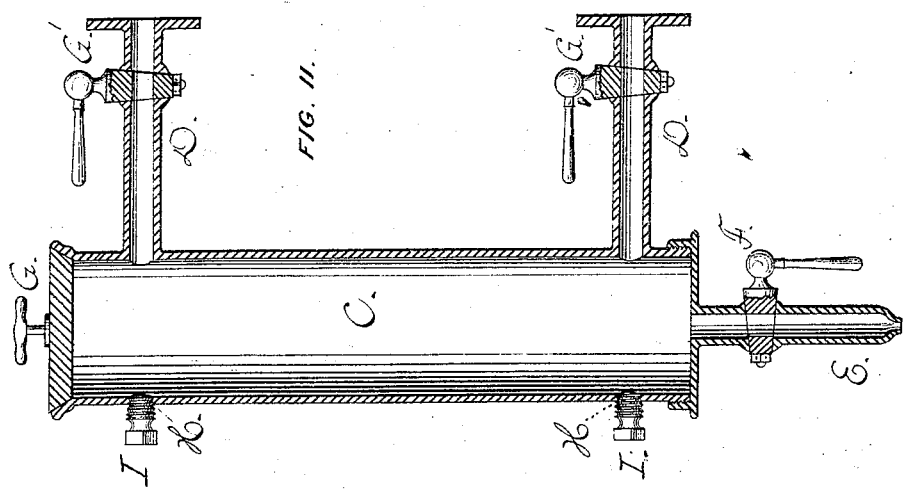

UNITED STATES PATENT OFFICE.

JOHANN NOSSIAN, OF SZTRAZSA, HUNGARY, AUSTRIA, ASSIGNOR OF ONE-HALF HIS RIGHT TO ABRAHAM KAUFMANN, OF NEW YORK CITY, N. Y.

IMPROVEMENT IN THE MANUFACTURE OF ROCK-CANDY.

Specification forming part of Letters Patent No. 153,721, dated August 4, 1874; application filed July 25, 1874.

*To all whom it may concern:*

Be it known that I, JOHANN NOSSIAN, of Sztrazsa, in Hungary, Austria, have invented certain new and useful Improvements in the Manufacture of Rock-Candy, of which the following is a specification:

My invention relates to a new and improved process or apparatus for the manufacture of rock-candy, by means of which the refined and filtered sirup can be rapidly evaporated and brought to the proper consistency for crystallization without danger of scorching and burning; and it consists, first, in evaporating the sirup by means of steam-heat, at a temperature of about 80° Reaumur, until it attains a consistency of 40° Baumé, after which it is run into molds and crystallized or solidified; and, second, in a new and improved apparatus to be attached to any ordinary vacuum-pan or vessel, by means of which small quantities of the sirup may be tested from time to time, by means of an aerometer or hydrometer, to determine its density.

In the drawing, Figure 1 represents an ordinary vacuum-pan or condenser, with the testing apparatus applied to the same; and Fig. 2 represents a detached sectional view of the testing apparatus.

A represents the vacuum-pan, which may be constructed after any of the ordinary methods, and heated by means of steam, by a steam-jacket surrounding the same, or a steam-coil passing through its interior. Said pan or chamber is provided with a thermometer, B, which is inserted through the top, the scale projecting outside, so that the temperature of the contents of said pan may be readily noted. To the side of said pan I attach a testing device, consisting of a vertical cylinder or tube, C, communicating with the interior of said vacuum-pan by means of two tubes, D D, extending from the upper and lower parts of said cylinder C, as shown. The tube C is provided at its bottom with a short tube, E, provided with a stop-cock, F, by means of which the sirup can be withdrawn, and it has at its top a stopper, G, ground or turned so as to fit accurately into a seat formed for the purpose, and securely close said tube or cylinder C. This stopper may be removed, when desired, for purpose of inserting an aerometer or hydrometer for the purpose of testing the gravity and determining the consistency of its contents. The tubes D D are provided with stop-cocks G' G', which may be turned simultaneously, so as to open or close the communication between the vacuum-pan A and the cylinder C. Directly opposite each tube D I provide an opening or aperture, H, which is closed by a screw-plug, I, or otherwise. The object of these apertures is to allow the insertion of a rod into said tubes D D, for clearing the same in case they should become clogged with sirup or sugar.

The operation of my invention is as follows: The vacuum-pan is properly charged, through an opening in the top for the purpose, with filtered and refined sirup, and heat is applied to the same until the temperature reaches 80° Reaumur, at which temperature the contents are kept until the sirup has attained a gravity or consistency of 40° Baumé. During the process of evaporation a vacuum is created in the pan or chamber A by means of an exhaust-pump, or otherwise, as may be convenient. From time to time during the process of evaporation the sirup requires to be tested to determine its density. This may be done by opening the cocks D D simultaneously, so as to allow the sirup to flow into and fill the tube or cylinder C, after which said cocks may be closed, when the stopper which closes its top may be removed, and its contents tested by means of an aerometer or hydrometer. I prefer the instrument known as Baumé's hydrometer for this purpose, although any other approved aerometer or hydrometer will answer. If the sirup has not attained a consistency of 40° Baumé, which is proper for its crystallization or solidification, it may be run off through the tube E by opening the stop-cock, and the process of evaporation continued. When the sirup has attained the proper gravity or consistency, 40° Baumé, as above stated, it is run off from the vacuum-pans into the molds and allowed to crystallize or solidify.

By my apparatus and process, I am enabled to evaporate and reduce the sirup to proper consistency much more rapidly than has heretofore been done in open pans, without any possible danger of scorching or burning the same, and can manufacture all varieties of rock-candy thereby, at a much less cost than has been possible by the old method of manufacture, and produce it in large quantities, perfectly clear and colorless.

My invention is designed particularly for the manufacture of rock-candy, in which case, the sirup, after reaching the proper consistency, is run into the ordinary molds, provided with strings, as usual, to facilitate crystallization; but it is evident to those skilled in the art of making candy that my invention may be employed with equal advantage for the manufacture of other varietes of candy.

What I claim is—

1. The process herein described of reducing the sirup to proper consistency for the manufacture of candy, by evaporating the same at a temperature of 80° Reaumur in a vacuum, as and for the purpose described.

2. An improved testing device, consisting of a tube or cylinder, adapted to communicate, by one or more pipes, with an ordinary vacuum-pan, by means of which the consistency of the sirup may be tested and determined during the process of evaporation, by an aerometer or hydrometer, substantially as described.

In testimony that I claim the foregoing I have hereunto set my hand.

JOHANN NOSSIAN.

Witnesses:
  JAMES L. NORRIS,
  ALBERT H. NORRIS.